United States Patent
Johansson et al.

(12) 
(10) Patent No.: US 11,060,854 B2
(45) Date of Patent: Jul. 13, 2021

(54) METHOD FOR DETERMINING SPINDLE ANGLES

(71) Applicant: Car-O-Liner Group AB, Västra Frölunda (SE)

(72) Inventors: Andreas Johansson, Kvicksund (SE); Mats Appelquist, Torslanda (SE)

(73) Assignee: Car-O-Liner Group AB, Västra Frölunda (SE)

( * ) Notice: Subject to any disclaimer, the term of this patent is extended or adjusted under 35 U.S.C. 154(b) by 9 days.

(21) Appl. No.: 16/628,202

(22) PCT Filed: Jun. 27, 2018

(86) PCT No.: PCT/EP2018/067260
§ 371 (c)(1),
(2) Date: Jan. 2, 2020

(87) PCT Pub. No.: WO2019/007780
PCT Pub. Date: Jan. 10, 2019

(65) Prior Publication Data
US 2021/0148701 A1 May 20, 2021

(30) Foreign Application Priority Data
Jul. 7, 2017 (EP) .................................. 17180261

(51) Int. Cl.
*G01B 11/26* (2006.01)
(52) U.S. Cl.
CPC .................................. *G01B 11/26* (2013.01)

(58) Field of Classification Search
CPC ....... G01B 11/26; G01B 11/272; G01B 11/27; G01C 15/004; G01C 15/002
USPC .......................................................... 356/138
See application file for complete search history.

(56) References Cited

U.S. PATENT DOCUMENTS

| | | |
|---|---|---|
| 3,888,592 A | 6/1975 | Geul |
| 6,298,284 B1 | 10/2001 | Burns, Jr. et al. |
| 6,404,486 B1 | 6/2002 | Nobis et al. |
| 7,236,240 B1 | 6/2007 | Wiora et al. |
| 2005/0078304 A1 | 4/2005 | Dorrance et al. |
| 2006/0274303 A1 | 12/2006 | Jackson et al. |

FOREIGN PATENT DOCUMENTS

DE 202007018657 U1 2/2009

OTHER PUBLICATIONS

PCT International Search Report and Written Opinion dated Aug. 7, 2018 for International Application No. PCT/EP2018/067260, 14 pages.

*Primary Examiner* — Md M Rahman
(74) *Attorney, Agent, or Firm* — RMCK Law Group, PLC (57) ABSTRACT

The present invention relates to a method for determining spindle angles of a steerable wheel axle arrangement. In particular, by means of the method, an image of at least one wheel axle optical marker arranged in connection with a wheel axle and an image of a spindle optical marker arranged in connection with the spindle is acquired, where after rotation of the spindle, center of rotation and an axis of rotation of the spindle can be determined.

15 Claims, 4 Drawing Sheets

METHOD FOR DETERMINING SPINDLE ANGLES

CROSS-REFERENCE TO RELATED APPLICATIONS

This application is a 371 U.S. National Stage of International Application No. PCT/EP2018/067260, filed Jun. 27, 2018, which claims priority to European Patent Application No. 17180261.4, filed Jul. 7, 2017. The disclosures of each of the above applications are incorporated herein by reference in their entirety.

TECHNICAL FIELD

The present invention relates to a method for determining spindle angles of a steerable wheel axle arrangement. The invention also relates to a corresponding system for determining spindle angles of a steerable wheel axle arrangement.

BACKGROUND

During vehicle manufacture and assembly, as well as maintenance, there is a desire to be able to determine wheel angles, such as e.g. how much the wheels are able to be turned when turning the steering wheel. Hereby, it is desirable to determine how much the spindle, onto which the vehicle wheel is mounted, can be rotated. Hence, the spindle is thus pivotably connected to a steerable wheel axle of the vehicle by means of e.g. a spindle bolt or the like. The wheel is in turn mounted on the spindle via a steering knuckle that comprises the spindle as well as a wheel hub. Accordingly, for determining the rotation capability of the wheels, it is desirable to determine how much the spindle can be rotated relative the wheel axle onto which the spindle is pivotably connected.

There are different approaches on how to measure these spindle angles. It is common practice to measure wheel angles when the vehicle is arranged at a wheel angle measuring station or the like. Hereby, the wheel angles are measured when the steerable wheel axle is connected to the chassis of the vehicle.

One approach of measuring wheel angles is present in U.S. Pat. No. 3,888,592. As described herein, a respective mirror is connected to the wheels of the vehicle. The mirrors are connected parallel to the wheels, and a projector and an image plane is positioned in front of the wheel. Hereby, the projector projects an image such as luminous spots, via the mirror which makes an angle α with the direction parallel to the longitudinal direction of the vehicle. By means of the angle α, the so-called toe-in and toe-out angles can be calculated.

The approach presented in U.S. Pat. No. 3,888,592 requires the vehicle to stand still while measuring the wheel angles, and there is thus a desire to be able to determine wheel angles when moving the vehicle, or the wheel axle in order to be able to perform the determination/calculation in factory when the wheel axle, for example is positioned on a movable conveyor belt.

SUMMARY

It is therefore an object of the present invention to provide a method which at least partially overcomes the deficiencies of the prior art. This is achieved by a method according to claim 1.

According to a first aspect of the present invention, there is provided a method for determining spindle angles of a steerable wheel axle arrangement, the steerable wheel axle arrangement comprising a wheel axle and a spindle pivotably connected to the wheel axle at a first, outer end position of the wheel axle, wherein at least one wheel axle optical marker is arranged in connection with the wheel axle and a spindle optical marker is arranged in connection with the spindle, wherein the method comprises the steps of acquiring, by an image capturing arrangement, an image of the at least one wheel axle optical marker and an image of the spindle optical marker for determining a position of each one of the at least one wheel axle optical marker and the spindle optical marker relative to the image capturing arrangement; determining a wheel axle coordinate system of the at least one wheel axle optical marker relative to the image capturing arrangement; determining a spindle coordinate system of the spindle optical marker relative to the image capturing arrangement; determining a position of the spindle coordinate system relative to the wheel axle coordinate system; rotating the spindle relative to the wheel axle; acquiring at least two different positions of the origin of the spindle coordinate system relative to the wheel axle coordinate system when rotating the spindle; and determining a center of rotation and an axis of rotation of the spindle relative to the wheel axle coordinate system based on the at least two different positions.

The spindle should be understood as forming part of a steering knuckle onto which the wheel of the vehicle is mounted. Thus, performing the above defined method with the wheel attached to the knuckle, the method is evidently performed to determine the spindle angles. As described above, the wheel axle optical marker is arranged in connection with the wheel axle and the spindle optical marker is arranged in connection with the spindle. This should be construed such that the optical markers need not be in direct and physical contact with the respective wheel axle and spindle. Conversely, the optical markers may be indirectly connected to the respective wheel axle and spindle via a component or bracket, etc.

The wording "optical marker" should be understood as an element comprising a pattern which is identifiable by the image capturing arrangement. The pattern may, for example, be a grid marked pattern with predefined size of each element/component of the grid and/or predefined size between the elements/components of the grid. Other shapes of the pattern are also conceivable, such as e.g. circles with known diameter, etc.

The image capturing arrangement may comprise one or more image capturing units, preferably in the form of respective camera(s). The camera should preferably be arranged to have a field of view such that it is able to capture an image of the at least one wheel axle optical marker and the spindle optical marker. The camera should also preferably have a resolution which is sufficient to identify the components of the optical marker from each other. Furthermore, the sample frequency of the camera should be sufficiently fast to be able to capture images of the optical markers during movement thereof.

Furthermore, by determining the center of rotation by means of two positions of the origin of the spindle coordinate system, the spindle optical marker should preferably have been calibrated in advance. In detail, the spindle optical marker should preferably be calibrated such that the position of the spindle optical marker relative the rotation axis of the spindle is determined/known in advance. If using more than two positions, such as at least three different positions, the spindle optical marker can be arranged at a relatively arbitrary position, i.e. no need to calibrate the position of the spindle optical marker.

By means of the image capturing arrangement and the at least one wheel axle optical marker and the spindle optical marker, a respective coordinate system which has an orientation and position in space relative the image capturing arrangement is defined. The distance/vector from the image capturing arrangement to the coordinate system of each of the optical markers can be determined. The distance calculation is performed by the knowledge of the size/distribution of the pattern of the optical markers. Hereby, the distance to the image capturing arrangement can be determined.

The present invention is based on the insight that an optical marker can be arranged in connection to the wheel axle and an optical marker can be arranged in connection to the spindle. Hereby, a fixed reference position is arranged in connection to the wheel axle. An advantage is thus that the method can be performed on a wheel axle arranged at an arbitrary orientation and position in space and as a result also during movement of the wheel axle, in particular during a rigid body motion of the wheel axle. The arrangement will thus allow for a non-linear motion, e.g. following an arbitrary curved motion of the wheel axle arrangement. Hereby, the above described method may be particularly useful in a conveyor belt application or similar equipment typically used on an assembly line, e.g. with a fixture holding the wheel axle arrangement on a moving carriage, that can twist, turn and sometimes also be tilted. Also, using the fixed reference position arranged in connection with the wheel axle and defining the coordinate system of the spindle optical marker relative the wheel axle optical marker, the image capturing arrangement can be arbitrary positioned in space, preferably at an elevated position relative the optical markers. The arrangement will also allow for a moving image capturing arrangement as the system is insensitive to any relative movement between the camera and the optical markers, as long as the optical markers are within the field of view of the image capturing arrangement.

Furthermore, it may be advantageous to perform the above described method without the wheel axle being connected to the vehicle chassis, or the spindle being connected to a wheel. Hereby, a reduced risk of errors in the measurements is achieved. Also it could be advantageous to perform this type of measurement early in the assembly process, as any errors relating to, or caused by, the spindle can be discovered early in the measurement process and thereby reducing the need to dis-assemble parts that are assembled later to the wheel axle arrangement.

According to an example embodiment, the step of determining the axis of rotation of the spindle may comprise the steps of determining a first vector based on a first and a second position of the origin of the spindle coordinate system; determining a second vector based on the second and a third position of the origin of the spindle coordinate system; and determining the axis of rotation of the spindle based on a cross-product of the first and second vectors.

Hereby, during the movement of the spindle, the image capturing arrangement detects at least three positions for subsequently determining the axis of rotation of the spindle. It should be realized that more than three positions may be acquired, although the principle of determining the axis of rotation may preferably be the same.

According to an example embodiment, the method may further comprise the step of projecting the position of the center of rotation of the spindle to an intersection point between the axis of rotation and a geometric plane defined by the non-vertical components of the wheel axle coordinate system.

The wording "projecting" should be understood such that the center of rotation is arranged in a geometric plane of the wheel axle coordinate system where the vertical component is zero. By projecting the position of the center of rotation of the spindle, a geometric axis of the wheel axle can subsequently be defined, as will be described below. Hereby, spindle angles can be measured relative to this geometric axis.

According to an example embodiment, the method may further comprise the step of projecting the position of the center of rotation of the spindle to a plane defined by the non-vertical components of the wheel axle coordinate system, said center of rotation is projected in a direction of a surface normal of the plane defined by the non-vertical components of the wheel axle coordinate system.

Hereby, an alternative step of projecting the position of the center of rotation of the spindle before defining the geometric axis for spindle angle measurements.

According to an example embodiment, the vertical component of the wheel axle coordinate system may correspond to the vertical component of the wheel axle.

Hereby, the wheel axle optical marker and the wheel axle are preferably arranged in parallel to each other such that the vertical components thereof correspond to each other, i.e. are arranged in the same direction. Hereby, the at least one wheel axle optical marker can be allowed to be positioned at any angle relative the vertical component of the wheel axle. An advantage is thus that the at least one optical marker can be more or less arbitrarily positioned on the wheel axle. Hence, no calibration is needed and the at least one optical marker can be connected to wheel axle by a suitable attachment configuration, such as e.g. magnets, an adhesive, etc.

According to an example embodiment, the spindle may be a first spindle, wherein the steerable wheel axle arrangement may further comprise a second spindle pivotably connected to the wheel axle at a second, outer end position of the wheel axle, the first and second end positions being arranged on opposite sides of the wheel axle, wherein a second spindle optical marker is arranged in connection with the second spindle; the method further comprising the steps of determining a second spindle coordinate system of the second spindle optical marker relative to the image capturing arrangement; determining a position of the second spindle coordinate system relative to the wheel axle coordinate system of the at least one wheel axle optical marker; rotating the second spindle relative to the wheel axle; acquiring at least two different positions of the origin of the second spindle coordinate system relative to the wheel axle coordinate system when rotating the spindle; and determining a second center of rotation and a second axis of rotation of the second spindle relative to the wheel axle coordinate system based on the at least two different positions; defining a geometric axis extending in a geometric plane defined by the non-vertical components of the wheel axle coordinate system between the axis of rotation of the first spindle and the axis of rotation of the second spindle; and measuring a spindle angle based on an angular displacement between the geometric axis and at least one of the first and second spindles.

The at least one wheel axle optical marker can either be the same wheel axle optical marker that was used for determining the center of rotation and the axis of rotation of the first spindle. However, a second wheel axle optical marker, different and spaced apart from the wheel axle optical marker used for determining the center of rotation and the axis of rotation of the first spindle may be used when determining the second center of rotation and second axis of rotation, as will also be described below. In the latter case, an image of the second wheel axle optical marker and the second spindle optical marker is thus acquired, whereby the position of the second spindle optical marker relative to the image capturing arrangement is determined.

An advantage is thus, as briefly indicated above, that a well defined geometric axis is determined. Hereby, the spindle angles can be measured relative to this geometric axis. The geometric axis is thus calculated by using the acquired images of the markers whereby no predetermined reference line is needed. Hereby, the spindle angles will be measured relative to the geometric axis defined between the first and second center of rotation. An advantage is that the risk of errors in measurements is reduced and the measured angle will not be affected by tolerances associated with measurements relative a physical entity. The measurement process will always measure the spindle angle relative the true definition of the geometric reference axis and errors in the manufacturing process of the axle can thus be detected if they relate to the physical reference points on the axle which are used to assemble the axle on the vehicle chassis.

Furthermore, if the image capturing arrangement comprises more than one image capturing unit as described below, these image capturing units can be positioned arbitrarily in relation to each other as long as they are each capable of capturing an image of two optical markers.

According to an example embodiment, the geometric axis may intersect at least the projected position of the first axis of rotation.

Hereby, the geometric axis is arranged in the plane defined by the vertical component being zero.

According to an example embodiment, the step of measuring a spindle angle may further comprise the step of projecting one of the non-vertical components of the spindle coordinate system to the plane defined by the non-vertical components of the wheel axle coordinate system.

Hereby, if the spindle, and in turn the spindle optical marker is arranged at an angle relative the horizontal plane of the wheel axle optical marker, the spindle coordinate system is projected such that the horizontal components of the spindle coordinate system are located in the same plane as the horizontal components of the wheel axle coordinated system.

According to an example embodiment, the at least one wheel axle optical marker may be a first wheel axle optical marker, the steerable wheel axle arrangement may further comprise a second wheel axle optical marker, wherein the second center of rotation and the second axis of rotation of the second spindle is determined relative to the wheel axle coordinate system of the second wheel axle optical marker.

As briefly described above, the steps of determining the second center of rotation and the second axis of rotation is performed in a similar manner as the above described step of determining the first center of rotation and the first axis of rotation.

An advantage is that the center of rotation and axis of rotation for the first and second spindles can be determined individually by means of one set of optical markers for the first spindle and one set of optical markers for the second spindle. Hereby, the image capturing arrangement may comprise a first image capturing unit arranged to capture an image of the first spindle optical marker and the first wheel axle optical marker, and a second image capturing unit arranged to capture an image of the second spindle optical marker and the second wheel axle optical marker.

According to an example embodiment, the image capturing arrangement may comprise a first and a second image capturing unit, the method further comprising the steps of moving the wheel axle arrangement in a rigid body motion between a first position and a second position; acquiring an image of the at least one wheel axle optical marker and the spindle optical marker by the first image capturing unit when the wheel axle arrangement is arranged in the first position; and acquiring an image of the at least one wheel axle optical marker and the spindle optical marker by the second image capturing unit when the wheel axle arrangement is arranged in the second position.

The first and second positions may be arranged in a conveyor belt application or the like, whereby different image capturing units are utilized as the wheel axle arrangement moves along the conveyor belt. Preferably, the second image capturing unit initiates the capturing of images before the optical markers are positioned outside the field of view of the first image capturing unit. Hence, the field of view of the first and second image capturing units may overlap such that when moving the wheel axle arrangement between the first and second positions, images may be taken by both the first and second image capturing units during a portion of the distance there between.

According to an example embodiment, the image capturing arrangement may repeatedly capture an image of the at least one optical marker and the spindle optical marker until the step of measuring the spindle angle is completed.

The wording "repeatedly" may also be referred to as "continuous" depending on the sample frequency of the image capturing arrangement. If arranging the wheel axle arrangement in the above described conveyor belt application, the second image capturing unit may thus continue to capture images of the optical markers if the spindle angle measurement is not finished when the optical markers are outside the field of view of the first image capturing unit.

According to a second aspect, there is provided a system for determining spindle angles of a steerable wheel axle arrangement, the steerable wheel axle arrangement comprising a wheel axle and a spindle pivotably connected to the wheel axle at a first, outer end position of the wheel axle, wherein the system comprises at least one wheel axle optical marker arranged in connection with the wheel axle, a spindle optical marker arranged in connection with the spindle, an image capturing arrangement arranged at an elevated position relative the steerable wheel axle arrangement, and a control unit connected to the image capturing arrangement, the control unit being configured to acquire, from the image capturing arrangement, an image of the at least one wheel axle optical marker and an image of the spindle optical marker for determining a position of each one of the at least one wheel axle optical marker and the spindle optical marker relative to the image capturing arrangement; determine a wheel axle coordinate system of the at least one wheel axle optical marker relative to the image capturing arrangement; determine a spindle coordinate system of the spindle optical marker relative to the image capturing arrangement; determine a position of the spindle coordinate system relative to the wheel axle coordinate system; acquire at least two different positions of the origin of the spindle coordinate system relative to the wheel axle coordinate system when rotating the spindle; and determine a center of rotation and an axis of rotation of the spindle relative to the wheel axle coordinate system based on the at least two different positions.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

According to an example embodiment, the system may further comprise a conveyor belt, wherein the steerable wheel axle arrangement is positioned on the conveyor belt and wherein the control unit is configured to determine the center of rotation and the axis of rotation during movement of the steerable wheel axle arrangement on the conveyor belt.

The conveyor belt may be arranged in the form of a rail onto which the wheel axle arrangement is connected, preferably via some sort of carrying structure. Other alternatives are also conceivable such as e.g. an assembly line or electrically controlled paths in the ground, onto which the carrying structure is transported, etc.

According to an example embodiment, the image capturing arrangement may further comprise a plurality of image capturing units arranged along the direction of movement of the conveyor belt.

According to an example embodiment, the mutual displacement between two image capturing units along the direction of movement of the conveyor belt is based on a field of view of the two image capturing units.

As described above, the field of view of the first and the second image capturing units may overlap. Hereby, images can be repeatedly acquired until the spindle angle is determined.

Further effects and features of the second aspect are largely analogous to those described above in relation to the first aspect. Hence, features described above in relation to the first aspect are applicable to the system described in relation to the second aspect, and vice versa.

Further features of, and advantages with, the present invention will become apparent when studying the appended claims and the following description. The skilled person realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

Figure 1:
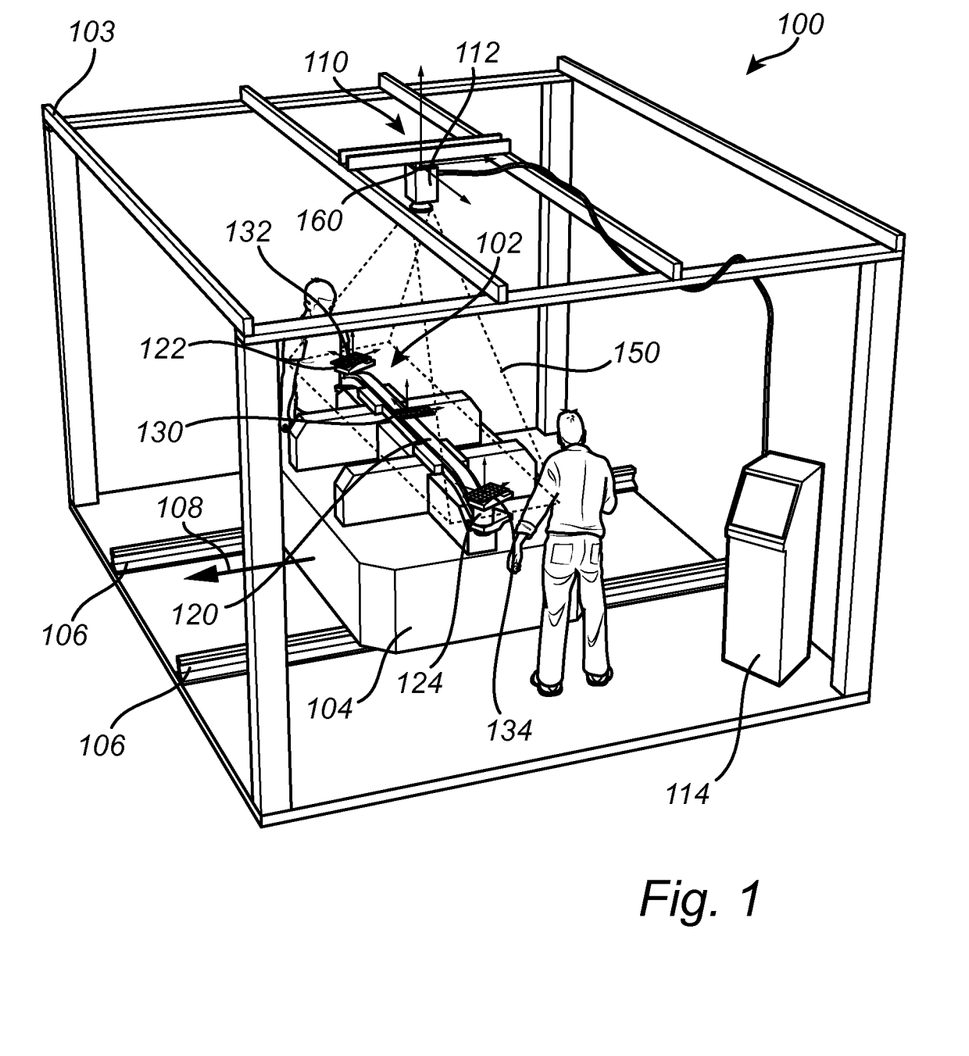
FIG. 1 is a perspective view schematically illustrating an example embodiment of a system for determining spindle angles of a steerable wheel axle arrangement.

With particular reference to FIG. 1, there is depicted system 100 for determining spindle angles of a steerable wheel axle arrangement 102. As depicted in FIG. 1, the system comprises a workbench 104 onto which the steerable wheel axle arrangement 102 is positioned. The steerable wheel axle arrangement 102 comprises a wheel axle 120 onto which a first 122 and a second 124 spindle is connected at a respective first and second outer end position of the wheel axle 120. Hereby, wheels (not shown) of a vehicle are connected to the respective spindles.

Furthermore, the schematically illustrated workbench 104 is connected to a rail arrangement such as to be movable in a direction 108 substantially perpendicular to the longitudinal extension of the steerable wheel axle arrangement 102. Hence, the steerable wheel axle arrangement 102 is connected to a conveyor belt arrangement 106. The invention should not be construed as limited to the conveyor belt arrangement depicted in FIG. 1 as other alternatives are conceivable, such as e.g. an autonomous driven bench without the use of guiding rails, or a conventional assembly line, etc.

Furthermore, the system 100 comprises an image capturing arrangement 110, here illustrated as comprising a single image capturing unit 112 connected to a frame structure 103. The image capturing unit 112 is preferably a camera and is connected to a control unit 114 for providing captured images to the control unit 114. The image capturing arrangement 110 is arranged to capture images of optical markers arranged in connection with the wheel axle 120 and the spindle(s) 122, 124 of the steerable wheel axle arrangement 102. Although only one image capturing unit 112 is depicted, the system 100 may preferably comprise a plurality of image capturing units connected to the frame structure 103 along the direction 108 of movement of the conveyor belt. Also, and as will be described in relation to FIG. 3 below, the image capturing arrangement 110 may comprise image capturing units arranged side by side with the depicted image capturing unit 112 in the direction perpendicular to the direction 108 of movement of the wheel axle arrangement 102. According to the embodiment depicted in FIG. 1, the system 100 comprises a first wheel axle optical marker 130 arranged in connection with the wheel axle 120, a first spindle optical marker 132 arranged in connection with the first spindle 122, and a second spindle optical marker 134 arranged in connection with the second spindle 124. The image capturing unit 112 in FIG. 1 thus comprises a field of view 150 sufficient to capture images of each of the first wheel axle optical marker 130, the first spindle optical marker 132 and the second spindle optical marker 134. By means of the images acquired by the image capturing arrangement 110, the distance from the image capturing arrangement 110 to each of the first wheel axle optical marker 130, the first spindle optical marker 132 and the second spindle optical marker 134 can be determined. Also, a coordinate system (depicted in FIG. 2 and described further below) for each of the first wheel axle optical marker 130, the first spindle optical marker 132 and the second spindle optical marker 134 is determined based on the configuration of the respective optical marker and is defined relative a coordinate system 160 of the image capturing arrangement 110. Hereby, if the optical marker is rotated, the coordinated coordinate system will also be rotated accordingly.

Figure 2:
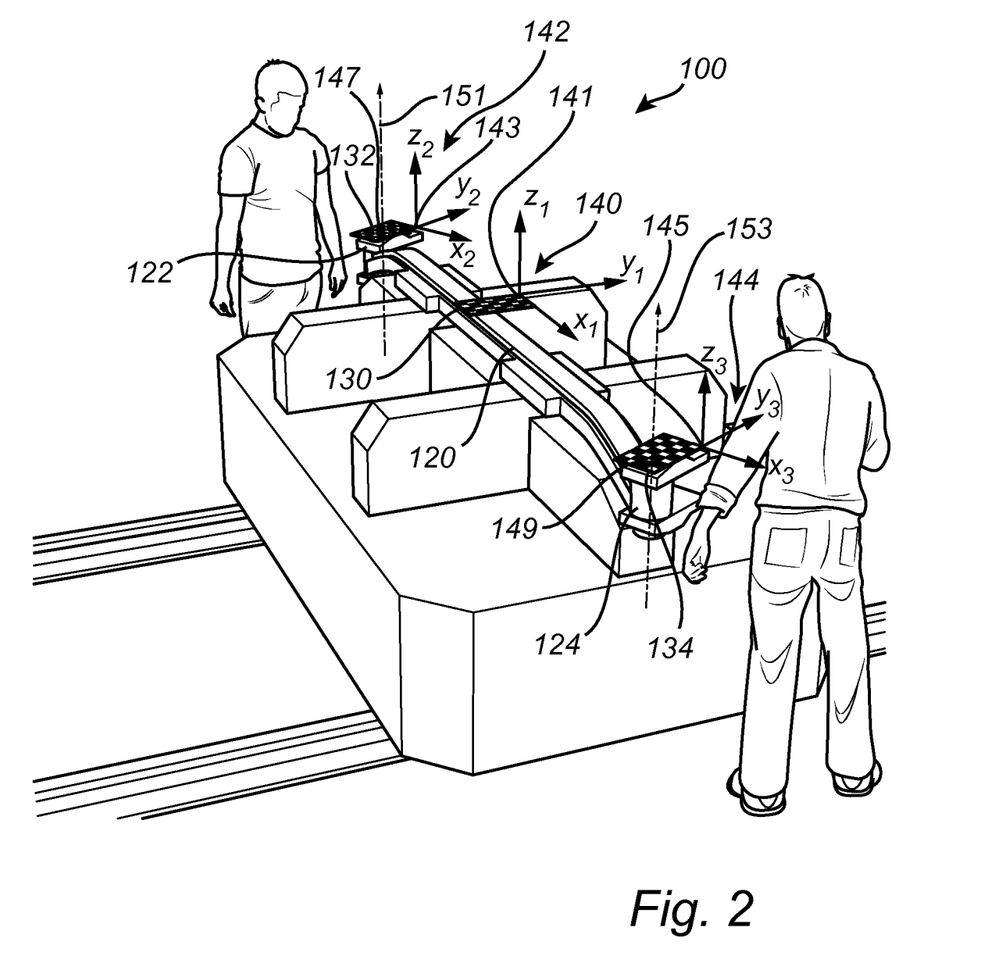
FIG. 2 is a further detailed illustration of the example embodiment depicted in FIG. 1.

Reference is made to FIG. 2, which is a further detailed illustration of the example embodiment depicted in FIG. 1. For simplicity of understanding, the frame structure 103, the image capturing arrangement 110 and the control unit 114 have been omitted from the illustration of FIG. 2. As described above, an image of the first wheel axle optical marker 130, the first spindle optical marker 132 and the second optical marker 134 is/are captured in order to determine a position in space of, and a distance to, a first wheel axle coordinate system 140, a first spindle coordinate system 142 and a second spindle coordinate system 144 relative the coordinate system 160 of the image capturing arrangement 110.

In order to utilize the wheel axle 120 as a fixed reference position and be able to position the image capturing arrangement 110 arbitrarily in space, the position of the origin 143 of the first spindle coordinate system 142 is determined relative to the first wheel axle coordinate system 141. Likewise, the position of the origin 145 of the second spindle coordinate system 144 is determined relative to the first wheel axle coordinate system 141. Hereby, the position, i.e. the distance and direction between the first wheel axle coordinate system 140 and the respective first 142 and second 144 spindle coordinate system is determined. The change of base from the coordinate system 160 of the image capturing arrangement 110 to the first wheel axle coordinate system 140 is preferably made by transformation calculations. Moreover, the change of base makes the system independent on the specific position of the image capturing arrangement 110, whereby the image capturing arrangement 110 can be arranged at a substantially arbitrary position.

Once the position of the first 142 and second 144 spindle coordinate systems are defined relative to the first wheel axle coordinate system 140, the respective center of rotation 147, 149 and axis of rotation 151, 153 of the first 122 and second 124 spindle can be determined. In order to determine the center of rotation 147, 149 and the axis of rotation 151, 153, the respective first 122 and second 124 spindles are rotated relative to the wheel axle 120. The rotation of the respective spindle can be made manually as depicted in FIG. 2, or automatically by a suitable arrangement connected and controlled by the control unit 114.

If the position of the respective first 132 and second 134 spindle optical marker is calibrated relative the rotation axis of the spindle, a minimum of two different positions of the origin 143, 145 of the first 142 and second 144 spindle coordinate systems need to be acquired when rotating the respective first 122 and second 124 spindle. The positions are acquired by the image capturing unit 110, whereby the center of rotation is determined. Also, by defining two vectors generated by the origin during the rotation of the spindle, the axis of rotation 151, 153 can be determined by calculating the respective cross-product of these two vectors.

On the other hand, if the position of the respective first 132 and second 134 spindle optical marker is not calibrated relative the rotation axis of the spindle, at least three different positions of the origin 143, 145 of the respective coordinate system needs to be acquired during the rotation of the first 122 and second 124 spindles.

In order to determine the spindle angle relative the wheel axle, a geometric axis (302 in FIG. 3) of the wheel axle 120 is preferably determined. This is preferably made by projecting the respective position of the center of rotation 143, 145 of the first 122 and second 124 spindles to a geometric plane defined by the non-vertical components of the wheel axle coordinate system 140. Hence, the geometric plane is defined by the $x_1$-axis and the $y_1$-axis of the wheel axel coordinate system 140 depicted in FIG. 2. This can be executed by projecting the position of the center of rotation 143, 145 of the respective spindles 122, 124 to an intersection point (not shown) between the respective axis of rotation 151, 153 and the above described geometric plane. Alternatively, the respective position of the center of rotation 143, 145 can be projected to the geometric plane in a direction corresponding to the direction of the surface normal of the geometric plane, i.e. in the same direction as the depicted $z_1$-axis of the wheel axel coordinate system 140 in FIG. 2.

Preferably, one of the non-vertical components of the respective spindle coordinate system 142, 144 is also projected onto the above defined geometric plane.

Figure 3:
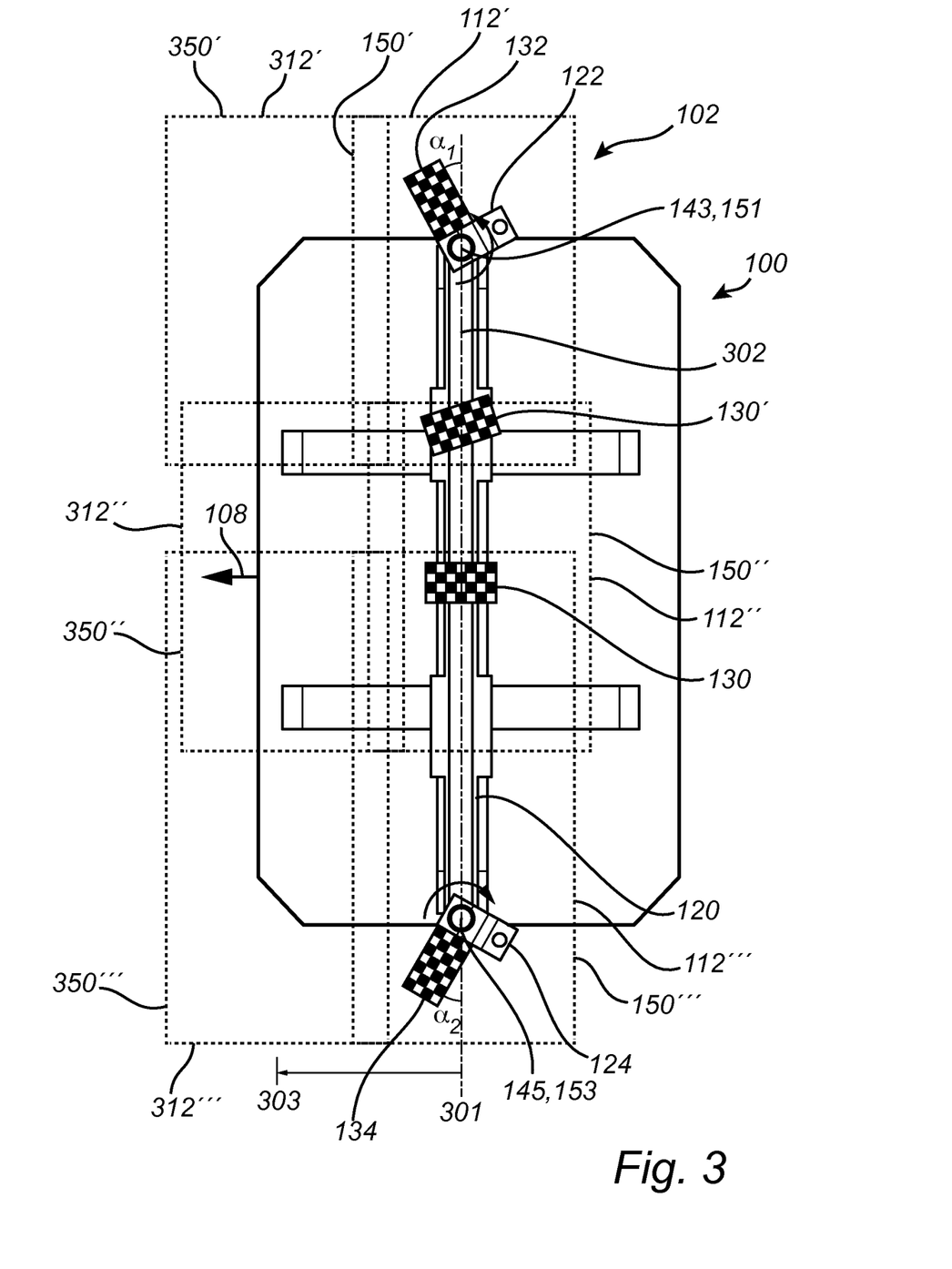
FIG. 3 is a view from above of the steerable wheel axle arrangement in FIG. 1 according to an example embodiment.

Reference is now made to FIG. 3 which illustrates the steerable wheel axle arrangement 102 from above according to an example embodiment. When the position of the center of rotation for the respective first 122 and second 124 spindles have been projected to the above defined geometric plane, the geometric axis 302 can be defined. The geometric axis 302 extends between the projected center of rotation 143 of the first spindle 122 and the projected center of rotation 145 of the second spindle 124. Hereby, a "zero-line" for determining/measuring spindle angles is defined. The spindle angles, denoted as $\alpha_1$ and $\alpha_2$, can thus be measured relative the geometric axis 302.

The above description have been generally made in relation to a single image capturing unit 112, as well as one wheel axle optical marker 130, and a first 132 and a second 134 spindle optical marker. However, and as depicted in FIG. 3, the system 100 may be arranged with further optical markers. As depicted in FIG. 3, the system further comprises a second wheel axle optical marker 130' arranged in connection to the wheel axle 120 at a distance from the first wheel axle optical marker 130.

According to the embodiment depicted in FIG. 3, the image capturing arrangement 110 comprises a first 112', a second 112" and a third 112''' image capturing unit which are illustrated by their respective field of view 105', 150", 150'''. As depicted in FIG. 3, the first image capturing unit 112' has a field of view 150' capturing an image of the first spindle optical marker 132 and the second wheel axle optical marker 130', the second image capturing unit 112" has a field of view 150" capturing an image of the first wheel axle optical marker 130 and the second wheel axle optical marker 130', and the third image capturing unit 112''' has a field of view capturing an image of the first wheel axle optical marker 130 and the second spindle optical marker 134. Hereby, a "chain" of images from the first spindle optical marker 132 to the second spindle optical marker 134 can be acquired such that the above defined geometric axis 302 can be defined for subsequently measuring spindle angles $\alpha_1$ and $\alpha_2$. Thus, it is possible to connect and relate the images together using the common target visible in the adjacent images. The center of rotation 147 and the axis of rotation 151 of the first spindle 122 are thus determined in relation to the second wheel axle optical marker 130', while the center of rotation 149 and the axis of rotation 153 of the second spindle 124 are determined in relation to the first wheel axle optical marker 130.

As also described above, the system 100 may suitable be used in a conveyor belt application where the steerable wheel axle arrangement 102 is moved in e.g. the direction denoted as 108. FIG. 3 illustrates the movement from a first position 301 to a second position 303. When the steerable wheel axle arrangement 102 is arranged at the first position 301, the first 112', second 112" and third 112''' image capturing units repeatedly captures images of the respective optical markers. As the steerable wheel axle arrangement 102 moves towards the second position 303, the optical markers will be arranged within the field of view 350', 350", 350''' of a fourth 312', a fifth 312" and a sixth 312''' image capturing unit of the image capturing arrangement 110. Hereby, a short time period before the steerable wheel axle arrangement 102 arrives at the second position, the fourth 312', fifth 312" and sixth 312''' image capturing units will initiate capturing images of the respective optical markers. An overlap between e.g. the field of view 150' of the first image capturing unit 112' and the field of view 350' of the fourth image capturing unit 112' is thus preferable. Hereby, images are repeatedly captured when the steerable wheel axle arrangement 102 is moved along the conveyor belt until the spindle angle is finally measured.

Figure 4:
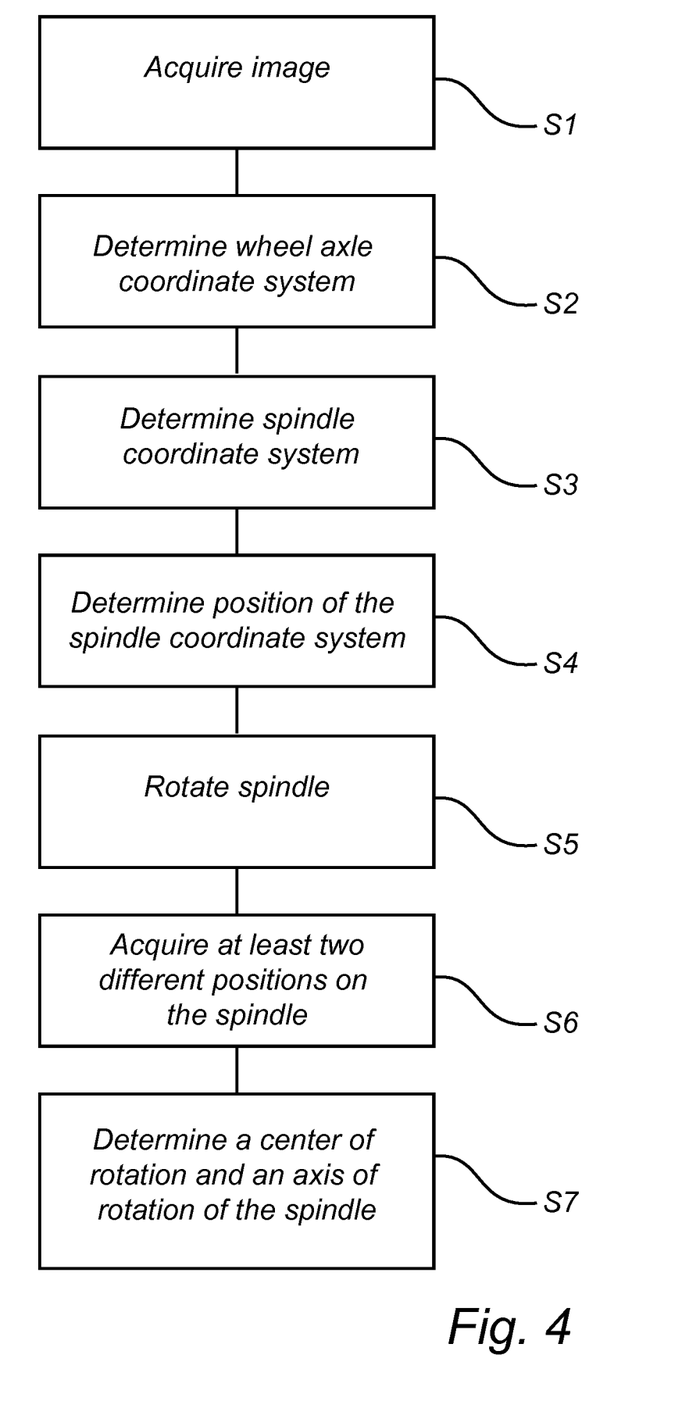
FIG. 4 is a flow chart of a method for determining spindle angles according to an example embodiment.

In order to sum up and describe an example embodiment of the method for determining spindle angles, reference is made to FIG. 4 in combination with FIGS. 1-3. Firstly, when arranging the steerable wheel axle arrangement 102 in the above described system 100, an image of the first wheel axle optical marker 130, the first spindle optical marker 132 and the second spindle optical marker 134 is acquired S1 by the image capturing arrangement 110. Depending on the setting of the system, the image capturing arrangement 110 may comprise a different number of image capturing units as described above. By means of the captured image(s), the position of each one of the first wheel axle optical marker 130, the first spindle optical marker 132 and the second spindle optical marker 134 relative to the image capturing arrangement 110 can be determined.

The wheel axle coordinate system 140 of the first wheel axle optical marker 130 is determined S2 relative the image capturing arrangement 110. Likewise, the first 142 and second 144 spindle coordinate systems are also determined S3 relative the image capturing arrangement 110. Thereafter, a position, preferably the origin 143, 145 of the respective spindle coordinate system 142, 144 relative to the wheel axle coordinate system 140 is determined S4. Hereby, the position of the respective spindle coordinate systems are defined relative the wheel axle coordinate system 140.

Thereafter, the spindles 122, 124 are rotated S5 relative the wheel axle 120. During the rotation, at least two different positions of the origin 143, 145 of the coordinate systems 142, 144 are acquired S6 for determining S7 the center of rotation 147, 149 as well as the axis of rotation 151, 153 of the respective first 122 and second 124 spindle.

The center of rotation 147, 149 can be projected to the plane defined by the $x_1$-axis and $y_1$-axis of the wheel axle coordinate system 140 such that the geometric axis 302 can be defined. Hereby, the angles $\alpha_1$ and $\alpha_2$ can be measured relative the geometric axis 302.

Although the figures may show a sequence the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps. Additionally, even though the invention has been described with reference to specific exemplifying embodiments thereof, many different alterations, modifications and the like will become apparent for those skilled in the art.

What is claimed is:

1. A method for determining spindle angles of a steerable wheel axle arrangement, the steerable wheel axle arrangement comprising a wheel axle and a spindle pivotably connected to the wheel axle at a first, outer end position of the wheel axle, wherein at least one wheel axle optical marker is arranged in connection with the wheel axle and a spindle optical marker is arranged in connection with the spindle, wherein the method comprises:
   acquiring, by an image capturing arrangement, an image of the at least one wheel axle optical marker and an image of the spindle optical marker for determining a position of each one of the at least one wheel axle optical marker and the spindle optical marker relative to the image capturing arrangement;
   determining a wheel axle coordinate system of the at least one wheel axle optical marker relative to the image capturing arrangement;
   determining a spindle coordinate system of the spindle optical marker relative to the image capturing arrangement;
   determining a position of the spindle coordinate system relative to the wheel axle coordinate system;
   rotating the spindle relative to the wheel axle;
      acquiring at least two different positions of the origin of the spindle coordinate system relative to the wheel axle coordinate system when rotating the spindle; and
      determining a center of rotation and an axis of rotation of the spindle relative to the wheel axle coordinate system based on the at least two different positions.

2. The method according to claim 1, wherein determining the axis of rotation of the spindle comprises:
   determining a first vector based on a first and a second position of the origin of the spindle coordinate system;
   determining a second vector based on the second and a third position of the origin of the spindle coordinate system; and
   determining the axis of rotation of the spindle based on a cross-product of the first and second vectors.

3. The method according to claim 1, further comprising:
   projecting the position of the center of rotation of the spindle to an intersection point between the axis of rotation and a geometric plane defined by the non-vertical components of the wheel axle coordinate system.

4. The method according to claim 1, further comprising:
   projecting the position of the center of rotation of the spindle to a plane defined by the non-vertical components of the wheel axle coordinate system, the center of rotation is projected in a direction of a surface normal of the plane defined by the non-vertical components of the wheel axle coordinate system.

5. The method according to claim 1, wherein the vertical component of the wheel axle coordinate system corresponds to the vertical component of the wheel axle.

6. The method according to claim 1, wherein the spindle is a first spindle, the steerable wheel axle arrangement further comprising a second spindle pivotably connected to the wheel axle at a second, outer end position of the wheel axle, the first and second end positions being arranged on opposite sides of the wheel axle, wherein a second spindle optical marker is arranged in connection with the second spindle; the method further comprising:
  determining a second spindle coordinate system of the second spindle optical marker relative to the image capturing arrangement;
  determining a position of the second spindle coordinate system relative to the wheel axle coordinate system of the at least one wheel axle optical marker;
  rotating the second spindle relative to the wheel axle;
    acquiring at least two different positions of the origin of the second spindle coordinate system relative to the wheel axle coordinate system when rotating the spindle; and
    determining a second center of rotation and a second axis of rotation of the second spindle relative to the wheel axle coordinate system based on the at least two different positions;
  defining a geometric axis extending in a geometric plane defined by the non-vertical components of the wheel axle coordinate system between the axis of rotation of the first spindle and the axis of rotation of the second spindle; and
  measuring a spindle angle based on an angular displacement between the geometric axis and at least one of the first and second spindles.

7. The method according to claim 6, further comprising:
  projecting the position of the center of rotation of the spindle to an intersection point between the axis of rotation and a geometric plane defined by the non-vertical components of the wheel axle coordinate system,
  wherein the geometric axis intersects at least the projected position of the first axis of rotation.

8. The method according to claim 6, wherein the measuring a spindle angle further comprises:
  projecting one of the non-vertical components of the spindle coordinate system to the plane defined by the non-vertical components of the wheel axle coordinate system.

9. The method according to claim 6, wherein the at least one wheel axle optical marker is a first wheel axle optical marker, the steerable wheel axle arrangement further comprising a second wheel axle optical marker, wherein the second center of rotation and the second axis of rotation of the second spindle is determined relative to the wheel axle coordinate system of the second wheel axle optical marker.

10. The method according to claim 1, wherein the image capturing arrangement comprises a first and a second image capturing unit, the method further comprising:
  moving the wheel axle arrangement in a rigid body motion between a first position and a second position;
  acquiring an image of the at least one wheel axle optical marker and the spindle optical marker by the first image capturing unit when the wheel axle arrangement is arranged in the first position; and
  acquiring an image of the at least one wheel axle optical marker and the spindle optical marker by the second image capturing unit when the wheel axle arrangement is arranged in the second position.

11. The method according to claim 1, wherein the image capturing arrangement repeatedly captures an image of the at least one optical marker and the spindle optical marker until the measuring the spindle angle is completed.

12. A system for determining spindle angles of a steerable wheel axle arrangement, the steerable wheel axle arrangement comprising a wheel axle and a spindle pivotably connected to the wheel axle at a first, outer end position of the wheel axle, wherein the system comprises at least one wheel axle optical marker arranged in connection with the wheel axle, a spindle optical marker arranged in connection with the spindle, an image capturing arrangement arranged at an elevated position relative the steerable wheel axle arrangement, and a control unit connected to the image capturing arrangement, the control unit being configured to:
  acquire, from the image capturing arrangement, an image of the at least one wheel axle optical marker and an image of the spindle optical marker for determining a position of each one of the at least one wheel axle optical marker and the spindle optical marker relative to the image capturing arrangement;
  determine a wheel axle coordinate system of the at least one wheel axle optical marker relative to the image capturing arrangement;
  determine a spindle coordinate system of the spindle optical marker relative to the image capturing arrangement;
  determine a position of the spindle coordinate system relative to the wheel axle coordinate system;
  acquire at least two different positions of the origin of the spindle coordinate system relative to the wheel axle coordinate system when rotating the spindle; and
  determine a center of rotation and an axis of rotation of the spindle relative to the wheel axle coordinate system based on the at least two different positions.

13. The system according to claim 12, further comprising a conveyor belt, wherein the steerable wheel axle arrangement is positioned on the conveyor belt and wherein the control unit is configured to determine the center of rotation and the axis of rotation during movement of the steerable wheel axle arrangement on the conveyor belt.

14. The system according to claim 13, wherein the image capturing arrangement further comprises a plurality of image capturing units arranged along the direction of movement of the conveyor belt.

15. The system according to claim 14, wherein the mutual displacement between two image capturing units along the direction of movement of the conveyor belt is based on a field of view of the two image capturing units.

* * * * *